United States Patent
Horng et al.

(10) Patent No.: US 6,650,653 B1
(45) Date of Patent: Nov. 18, 2003

(54) SOFTWARE-BASED DIGITAL RECEIVER ADAPTABLE TO MULTIPLE MULTIPLEXING SCHEMES

(75) Inventors: Jyhchau Horng, Warren, NJ (US); Jay Bao, Bridgewater, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/487,095

(22) Filed: Jan. 19, 2000

(51) Int. Cl.[7] .............................. H04L 27/00; H04J 1/00
(52) U.S. Cl. ..................... 370/437; 370/210; 375/347
(58) Field of Search .............................. 370/203, 204, 370/310, 342, 343, 344, 345, 347, 431, 436, 437, 441, 442, 445, 330; 455/130; 375/347, 267

(56) References Cited

U.S. PATENT DOCUMENTS

| | | | |
|---|---|---|---|
| 5,255,290 A | * 10/1993 | Anvari | 375/344 |
| 5,623,511 A | * 4/1997 | Bar-David et al. | 375/143 |
| 5,812,615 A | 9/1998 | Baum et al. | 375/344 |
| 5,914,987 A | 6/1999 | Fogel | 375/340 |
| 6,275,543 B1 | * 8/2001 | Petrus et al. | 375/324 |
| 6,278,697 B1 | * 8/2001 | Brody et al. | 370/310 |
| 6,351,499 B1 | * 2/2002 | Paulraj et al. | 375/267 |

OTHER PUBLICATIONS

Kourtis et al. "Software Radio 2G & 3G Inner Receiver Processing". IEEE UMTS Terminals and Software Radio. Apr. 26, 1999. pp. 6/1–6/7.*
Akansu et al.; "Orthogonal Transmultiplexers in Communication: A Review"; IEEE Transactions of Signal Processing, vol. 46, No. 4, Apr., 1998; pp. 979–995.
Sayeed et al.; "Joint Multipath–Doppler Diversity in Mobile Wireless Communications"; IEEE Transactions on Communications, vol. 47, No. 1, Jan., 1999; pp. 123–132.

* cited by examiner

Primary Examiner—Melvin Marcelo
Assistant Examiner—Derrick W. Ferris
(74) Attorney, Agent, or Firm—Dirk Brinkman; Andrew Curtin

(57) ABSTRACT

In a digital radio receiver, transmitted symbols are recovered from a received signal that includes tim-shifted and frequency-shifted copies of a transmitted signal. A channel estimator extracts channel characteristics from a training signal. Receiver data and software for executing in a processor are stored in a memory connected to the processor. A parameter controller generates receiver configuration parameters from the channel characteristics and the receiver data. The received signal is decomposed into a matrix of samples according to the receiver configuration parameters to adapt the receiver to a multiple multiplexing schemes. An inner product is formed of the samples and channel characteristics, and the transmitted symbols are recovered from the inner product.

15 Claims, 2 Drawing Sheets

SOFTWARE-BASED DIGITAL RECEIVER ADAPTABLE TO MULTIPLE MULTIPLEXING SCHEMES

FIELD OF THE INVENTION

The present invention relates generally to wireless receivers, and more particularly to receivers configured to operate in multiple multiplexing schemes.

BACKGROUND OF THE INVENTION

The explosive growth in telecommunication and multimedia applications demands flexible, efficient, high performance receivers. Most current digital receivers focus on detecting a transmitted signals for a particular modulation or multiplexing scheme. That is, the receivers are "hard-wired" for only one scheme, or multiple schemes are implemented with redundant hardware. Because many different communication standards exist, a flexible receiver architecture is necessary. If the receiver can be configured in real time to adapt to different multiplexing schemes, a user can operate the receiver in different geographical areas, or select a particular communication service provider at will.

In addition, for mobile communication devices, which are becoming increasingly popular, fast-fading is a problem. Fast-fading is exhibited as rapid temporal fluctuations in the power of the received signal. Consequently, when the mobile user is moving, the resulting Doppler spread substantially degrades the receiver's performance due to errors in channel state estimation. Multi-path interference is another serious problem. In a multi-path channel, the original transmitted signal reflects from obstacles in the channel path, such as buildings, high terrain, and mountains. The receiver has to contend with several copies of the signal, the copies having different delays. Actually, from each multi-path signal's point of view, other multi-path signals can be regarded as interference and they need to be suppressed by the processing gain.

Fading, and the associated Doppler spread, as well as multi-path interference will continue to be the central issues for the next generation of wireless communication devices. It is desired to provide receivers that minimize these channel impairments.

In the prior art, a partial solution has been proposed. The solution is based on a direct sequence spread spectrum (DSSS) reception algorithm as described by Sayeed et al. in "Joint Multipath-Doppler Diversity in Mobile Wireless Communications," IEEE, Transactions on Communications, vol. 47, pp. 123–132, January 1999. This receiver is designed specifically for CDMA multiplexing, and will not work for other multiplexing schemes.

As shown in FIG. 1, their solution uses a DSSS receiver 100 for coherently processing a received signal 101. If channel coefficients are not available, and only their power is known, then incoherent processing may well be used. The receiver 100 uses short time Fourier transforms (STFT $q_1$ and STFT $q_0$) 102. Channel responses, i.e., the channel coefficients, 103 are applied to the transformed signals in a combiner 104. The resulting signals are provided to an adder 105 to produce a signed real part of the received signal (Sgn(Re(*)) 106. In Sayeed's receiver the matched filters are configured as conventional RAKE receivers, and therefore can only process a single multiplexing scheme, i.e., CDMA, as stated above.

Their algorithm combines time and frequency diversities to achieve higher processing gains, especially for fast fading channels. In fact, their STFF-based algorithm is a special case of filter bank-based transmultiplexers as described by Akansu et al. in "Orthogonal Transmultiplexers in Communication: A Review,"IEEE Trans. Signal Processing, vol. 46, no. 4, pp. 979–995, April 1998.

However, configuring these prior art receiving techniques for multiple multiplexing schemes is still a problem because of the design of the matched filters and other hard-wired restrictions.

SUMMARY OF THE INVENTION

The invention provides an architecture for a digital radio receiver adaptable to multiple multiplexing schemes of operation. The present architecture uses software to configure the receiver in real time. The software executes on a generic receiver hardware platform. The software configurable receiver can adapt to multiple multiplexing schemes such as Time Division Multiple Access (TDMA), Frequency Division Multiple Access (FDMA), Code Division Multiple Access (CDMA), Orthogonal Frequency Division Multiplexing (OFDM), Multi Carrier CDMA (MC-CDMA), and the like.

By changing receiver configuration parameters at will, using software, the receiver according to the present invention can support multi-scheme and multi-band operations. This provides a solution for a cost effective receiver in the presence of the existence of multiple standards in the communication industry.

Instead of using multiple filter banks to perform multiple multiplexing schemes as in the prior art, the present invention uses a sampled-STFT-decomposition-based architecture for different multiplexing schemes. By using a software-controlled method, the present invention enables a digital receiver to operate in multiple multiplexing schemes by changing configuration parameters. The receiver also has channel equalization capabilities by combining channel estimates with decomposed samples.

More particularly, in a digital radio receiver, transmitted symbols are recovered from a received signal that includes time-shifted and frequency-shifted copies of a transmitted signal. A channel estimator extracts channel characteristics from a training signal. Receiver data and software for execution in a processor are stored in a memory connected to the processor.

A parameter controller generates receiver configuration parameters from the channel characteristics and the receiver data. The received signal is decomposed into a matrix of samples according to the receiver configuration parameters to adapt the receiver to multiple multiplexing schemes. An inner product is formed from samples and the channel characteristics. The symbols are recovered from the inner product.

DETAILED DESCRIPTION OF THE PREFERRED EMBODIMENT

Digital Receiver Architecture Overview

Figure 1:
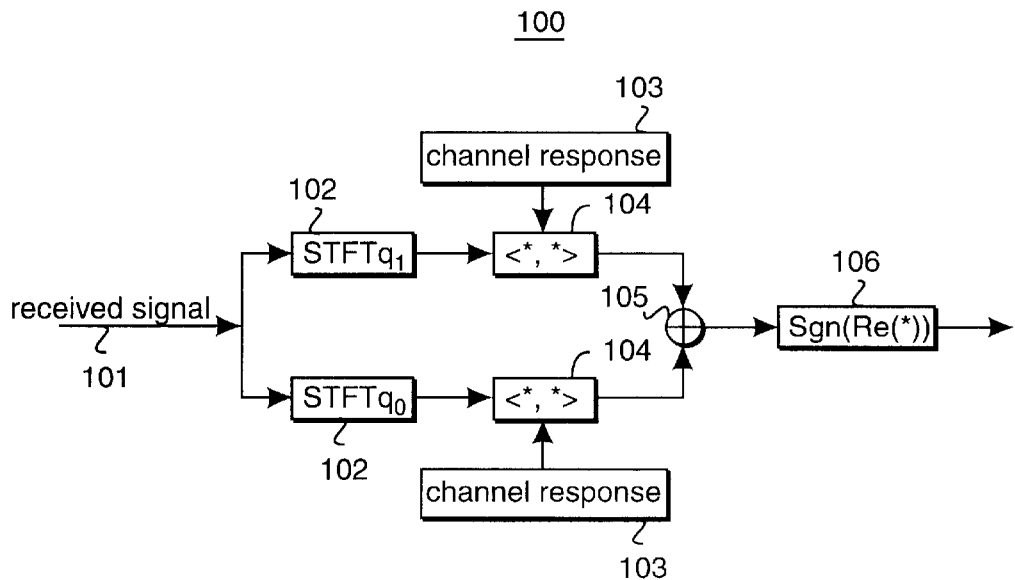
FIG. 1 is a block diagram of a prior art DSSS receiver.
Figure 2:
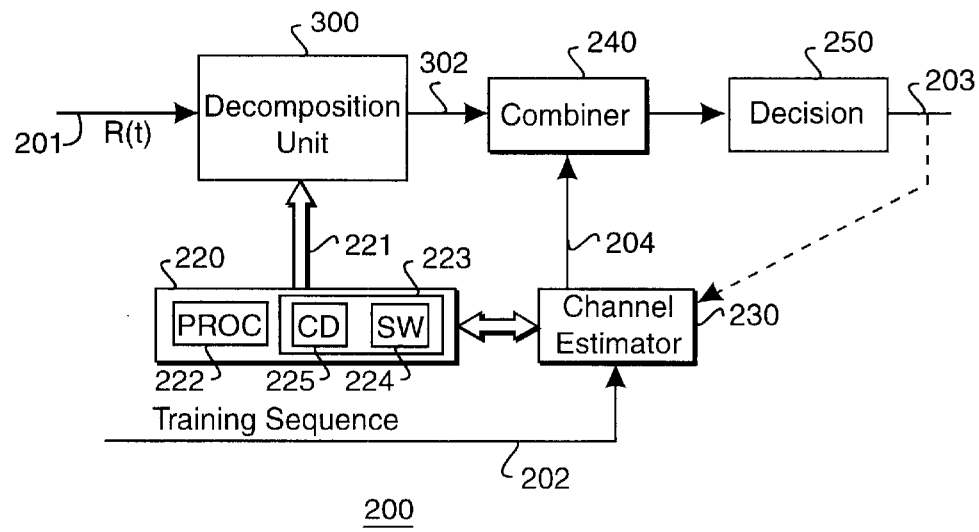
FIG. 2 is a block diagram of an adaptable digital receiver according to the invention.

FIG. 2 shows an adaptable digital receiver 200 according to our invention. Our receiver 200 includes a decomposition unit (DU) 300, a parameter controller (PC) 220, a channel estimator (CE) 230, a combiner 240 and a decision unit 250.

A baseband received signal (R(t)) 201 is provided to the DU 300. As a characteristic, the received signal 201 includes a linear combination of time-shifted (multi-path) and frequency-shifted (Doppler) copies of a transmitted signal. The output of the DU is provided to the combiner 240, and the output of the combiner is fed to the decision unit 250 which provides the output signal 203, i.e., "symbols." A pilot or training sequence 202 is fed to the CE 230. The CE analyzes this signal to provide parameter signals to the PC 220, and to the combiner 240 via 204. The PC accordingly generates receiver configuration parameters 221 for the DU 300 and the CE 220.

Operations

For simplicity, we will describe the detailed operations of our receiver for a CDMA multiplexing scheme, followed by a description of extension to other multiplexing schemes. The main function of the DU 300 is to decompose the received signal 201 into samples on a time-frequency plane. In general, time and frequency diversities are natural characteristics in wireless communication channels. For example, multi-path channels cause time diversities, and fading channels (Doppler effect) result in frequency diversities. Therefore, joint time-frequency processing can result in higher diversity gains.

Decomposition Unit

Figure 3:
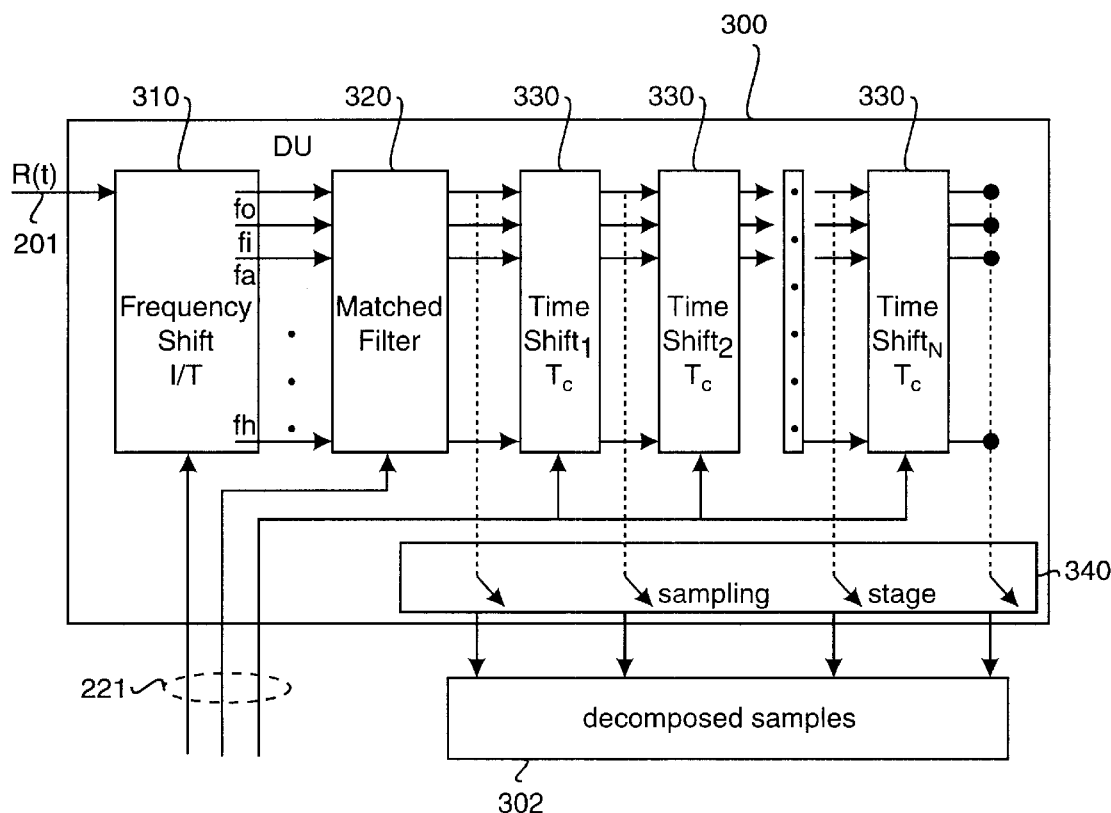
FIG. 3 is a block diagram of a decomposition unit of the receiver of FIG. 2.

FIG. 3 shows the decomposition unit 300 in greater detail. The DU is configured for joint decomposition of the received signal. The DU 300 includes at least one frequency shift stage 310, a matched filter stage 320, one or more time shift stages 330, and a sample stage 340. The stages are connected to each other in a serial manner. Note, it is possible to extend this design both horizontally, and vertically. As an advantage, the frequency shift, matched filter, and time shift stages are software controlled by the receiver configuration parameters 221 generated by the parameter controller 220. Thus, our receiver can be adapted to multiple multiplexing modes.

The DU 300 performs four basic operations: frequency shifting, matched filtering, time shifting, and sampling.

The received baseband signal 201, modulated to different Doppler frequencies by the frequency shifting stage 310, is provided to the different matched filters of stage 320. For the CDMA multiplexing scheme, the impulse response of the matched filters is chosen by the parameter controller 220. In this CDMA case, the configuration parameters $q^m(-t)$ are set to match the signature waveform q(t) and a pseudo-random noise (PN) sequence such that the cross-correlation of the received signal and the periodic despreading signal has a peak centered at zero delay. The PN sequence is a sequence of binary numbers, e.g.±1 in bipolar notation, which appears to be random, but is in fact perfectly deterministic.

Alternatively, for TDMA and FDMA schemes, the impulse response of the matched filter 320 is the Dirac delta function to bypass the input signals. As an advantage, the delta function can be altered by the receiver configuration parameters 221 to enable processing of multiple multiplexing schemes. For the OFDM scheme, the impulse response of the matched filter should be chosen to be the square window function.

The frequency shift stage 310 modulates the received signal by 1/T, where the configuration parameter T is the symbol duration. Every time shift stage 330 has a delay of $T_c$. The parameter $T_c$ is the chip duration. The samples at each time shift output node are sampled at every T by the sampling stage to form the (K+1)×(N+1) matrix of output samples 302, where the configuration parameters K and N are the number of frequency shifts and time shifts, respectively.

In addition, unlike the prior art, the parameter N, or the number of time shift taps is programmable as part of the receiver configuration parameters 221. This enables the best SNR at a lowest processing latency for a given data rate. For example, a smaller N may be chosen for slower data rates. This can be done by the combiner 240 by selectively masking off the extra time shift taps. Alternatively, the receiver configuration parameters can activate an optimal number of taps to maximize performance.

In FIG. 3, a time index parameter t, of the taps, is equal to the sample rate parameter T multiplied by integer values p=0, 1, 2, 3, etc.

For the single user case, the parameter controller 220 chooses the configuration parameter K to be greater than zero. This combats the Doppler spread. The selection of the parameter N is dependent on the multi-path effect. In general, the number of time shifts should be greater than the length of the PN sequence for detection. As a result of the modular structure of our decomposition unit 300, it is extendable horizontally and vertically to perform various functions.

Parameter Controller

The PC 220 stores configuration data (CD) 225, such as signature waveforms, data rates, and chip rates, transmitter chip sequences, etc., for various multiplexing schemes. The parameter controller can be implemented as a microprocessor (proc) 222 with a memory 223 having the capability to execute stored software programs (SW) 224. When operating in a particular multiplexing scheme, the PC downloads, under software control, appropriate receiver configuration parameters 221 from the PC memory into the stages of the DU and the channel estimator 230.

If we change the configuration parameters $T_c$ and T, for example, then the receiver 200 will operate in a different scheme, e.g., different data rates, different code length, and the like. The PC 230 also provides the parameter information for the CE 230 to make channel estimations. The CE feeds back the channel characteristics to the PC 220 to update the stored receiver configuration parameters, such as the parameters K and N.

Combiner

The combiner 240 performs an inner product operation on the decomposed samples output from the DU and the outputs of the CE, i.e., channel characteristics or weight matrix masks, for the purpose of channel equalization. Combining these data as an inner product is sufficient input for the decision unit 250

Decision Unit

The decision unit 250 processes the combined samples to recover the transmitted symbols. We can extend the decision unit to include adaptive equalization functions, for example, by using any known decision feedback architecture.

Results

Figure 4:
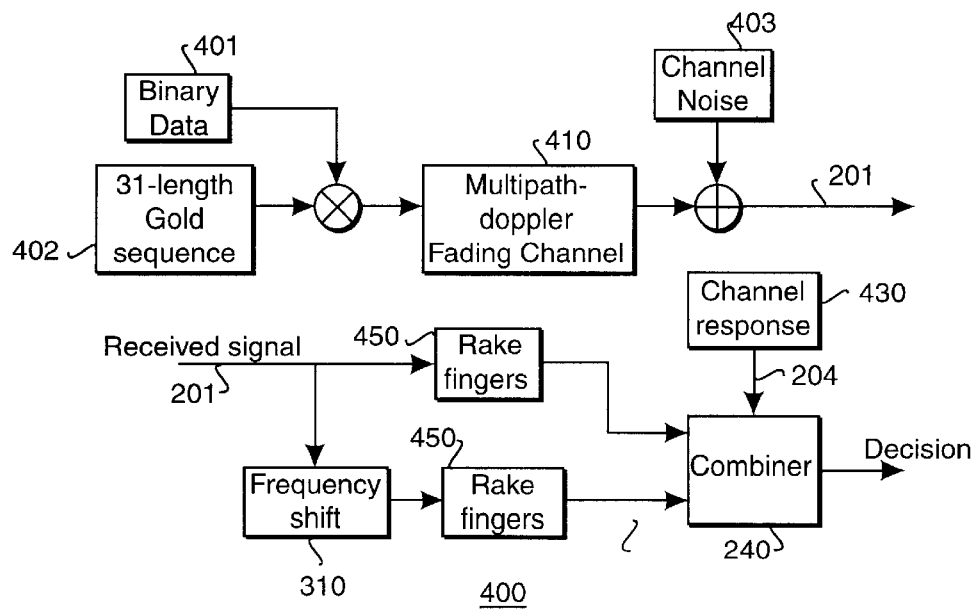
FIG. 4 is a block diagram of a simulation scheme for the receiver of FIG. 2.

FIG. 4 shows a system 400 for simulating our receiver 200. In the system 400, binary input data 401 is spread with a 31-length Gold code 402. Gold codes are well known. In spread-spectrum systems, the code is generated by summing outputs of two spread-spectrum code-sequence generators with modulo-two addition. Alternatively, a Kasami code could be used for the spreading.

A channel 410 provides multi-path interference (two-paths) and Doppler fading with a bandwidth of $B_d$. With the presence of the additive white Gaussian noise 403, the "received" signal 201 is generated. The received signal 201 is detected using a receiver according to our invention. The receiver has a two-branch RAKE finger, one for each Doppler frequency. The frequency shift parameters K can be 1, and the time shift parameter N can be thirty.

For convenience, we define a spreading factor p to be $TB_d$, i.e., the product of the symbol duration T and Doppler bandwidth $B_d$. We compare the bit-error-rate (BER) performance between using a 1-branch Rake receiver and 2-branch Rake receiver 450 for the case of a signal-to-noise ratio equal to 15 dB. For various values of spreading factor, Table 1 shows the simulation results.

TABLE 1

| spreading factor ρ | 0.2 | 0.4 | 0.6 |
|---|---|---|---|
| power percentage at 2$^{nd}$ branch | 1.25% | 5% | 10% |
| BER using 1 branch | $1.3 \times 10^{-4}$ | $2.2 \times 10^{-4}$ | 0.004 |
| BER using 2 branches | $7.5 \times 10^{-5}$ | $2.4 \times 10^{-5}$ | $<10^{-5}$ |

The energy percentage that is contributed at the $2^{nd}$ branch is also calculated for each case. Obviously from this table, we conclude that even the relatively small Doppler spreads encountered in practice yield significant diversity gains. For fast fading channels, our receiver has a significant improvement over conventional prior art Rake receivers.

Advantages of an Adaptable Receiver Architecture

Processing Gains: The time-frequency-processing based architecture of our adaptable receiver achieves higher processing gains over conventional Rake receivers. This minimizes the problem of fast fading channels. The results in Table 1 show that we obtain significant improvements even for a relatively small Doppler spread.

Configurable: Due to the modular structure of our decomposition unit, a software configurable hardware implementation becomes feasible and extendable. The configurable property of our receiver also makes our architecture suitable for multiple multiplexing schemes.

Multi-Rate: For multi-rate operations, we need only one local oscillator to generate a basic frequency, or time duration. This basic frequency can be divided into desired operational frequencies or time durations for multi-rate operations by the configuration parameters.

Complexity: It is noted that the complexity of each branch in the decomposition unit is equivalent to that in a conventional Rake receiver. Therefore, the total complexity is (K+1) times that of the conventional Rake receiver, where K is the number of the frequency shifters.

Equalization: While cooperating with adaptive channel estimation algorithms, our architecture also supports adaptive equalization capabilities.

Applications

Applying our configurable digital receiver to other multiplexing schemes is straightforward. This can be done by storing configuration data in the memory of the parameter controller for appropriate demultiplxing schemes. For TDMA FDMA schemes, the impulse response of the matched filter 320 is the Dirac delta function (unit impulse) to bypass the input signals. However, the impulse response should remain the same for CDMA as for MC-CDMA schemes. For the OFDM scheme, the impulse response of the matched filter should be chosen to be the square window function. The value of the configuration parameter K (number of frequency shift) should be greater or equal to the number of sub-carriers for OFDM and MC-CDMA schemes to combat the Doppler spread. This can be accomplished by storing look-up tables in the memory of the PC 220.

It is noted that each CDMA, MC-CDMA and OFDM user needs a DU and CE for multi-user detection. Every DU uses different signature waveform for user identification and each CE estimates the channel response for each user independently. Multi-user signal separation is provided for CDMA and MC-CDMA schemes to improve the performance of reception.

Due to the central nature of the wireless mobile channel, joint multi-path/Doppler processing provides an alternative to other diversity combining methods, such as space-time processing. In some practical applications, such as where the available spaces are limited at the base station, satisfactory diversity gains can not be guaranteed when applying the space-time processing techniques. Joint space-time-frequency processing, therefore, provides another diversity combining method to this problem since a high level of diversity dimensions will increase the performance improvement.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A digital radio receiver for recovering symbols from a received signal, comprising:

a channel estimator configured to generate channel characteristics from a training signal;

a parameter controller, coupled to the channel estimator, including memory and processor, the memory for storing configuration data and software for executing in the processor, the parameter controller for generating receiver configuration parameters for the channel estimator;

a decomposition unit, coupled to the parameter controller, configured to decompose the received signal into samples according to the receiver configuration parameters to adapt the receiver to a plurality of multiplexing schemes, the received signal including time-shifted and frequency-shifted copies of a transmitted signals;

a combiner, coupled to the decomposition unit, forming an inner product of the samples and the channel characteristics; and a decision unit, coupled to the combiner, configured to recover transmitted symbols from the inner product.

2. The receiver of claim 1 wherein the transmitted signal is a digital baseband signal.

3. The receiver of claim 1 wherein the decomposition unit further comprises:

at least one frequency shift stage;

a matched filter stage;

at least one time shift stage; and a sample stage sequentially serially connect to each other.

4. The receiver of claim 3 wherein the stages are extendable horizontally and vertically.

5. The receiver of claim 3 wherein the at least one frequency shift stage and the matched filter stage and the at least one time shift stage are software controlled by the receiver configuration parameters.

6. The receiver of claim 3 wherein the impulse response of the matched filter stage is set to match the signature waveform q(t) and a pseudo-random noise sequence such that the cross-correlation of the received signal and periodic despreading signal has a peak centered at a zero delay to adapt the receiver to a CDMA multiplexing scheme.

7. The receiver of claim 3 wherein the impulse response of the matched filter is a Dirac delta function to adapt the receiver to a selected one of TDMA, FDMA, and OFDM multiplexing schemes.

8. The receiver of claim 1 wherein a particular receiver configuration parameter T is the duration of the transmitted symbols.

9. The receiver of claim 3 wherein the at least time shift stage has a delay of a particular receiver configuration parameter $T_c$ and where $T_c$ is equal to a duration of a chip of the transmitted symbol.

10. The receiver of claim 3 or claim 8 wherein the at least one time shift stage has a plurality of output nodes, and the sampling stage samples the plurality of nodes at every T to form a (K+1)×(N+1) matrix of samples, and wherein configuration parameters K and N are the number of frequency shifts and time shifts, respectively.

11. The receiver of claim 1 wherein the configuration data includes signature waveforms, data rates, chip rates, and transmitter chip sequences for the plurality of multiplexing schemes.

12. The receiver of claim 1 wherein the decision unit further comprises adaptive equalization functions.

13. The receiver of claim 1 wherein the receiver configuration parameters are modified in real time by the parameter controller.

14. The receiver of claim 1 wherein a particular multiplexing scheme is selected from one of TDMA, FDMA, CDMA, OFDM, MC-CDMA multiplexing schemes.

15. A method for recovering symbols from a received signal in a digital radio receiver, comprising the steps of:

estimating channel characteristics of a training signal;

storing receiver data and software for executing in a processor in a memory connected to the processor;

generating receiver configuration parameters from the channel characteristics and the receiver data;

decomposing the received signal into samples according to the receiver configuration parameters to adapt the receiver to a plurality of multiplexing schemes, the received signal including time-shifted and frequency-shifted copies of a transmitted signals;

forming an inner product of the samples and the channel characteristics; and recovering transmitted symbols from the inner product.

* * * * *